US005933935A

United States Patent [19]

Alcorn

[11] Patent Number: 5,933,935

[45] Date of Patent: Aug. 10, 1999

[54] RETAINER RING TOOL

[75] Inventor: Arnold B. Alcorn, Wooster, Ohio

[73] Assignee: Custom Hoists, Inc., Hayesville, Ohio

[21] Appl. No.: 09/005,880

[22] Filed: Jan. 12, 1998

[51] Int. Cl.[6] .......... B23P 19/04

[52] U.S. Cl. .......... 29/229; 269/3; 29/239

[58] Field of Search .......... 29/229, 225, 238, 29/239, 242, 256, 278, 265; 269/242, 3

[56] References Cited

U.S. PATENT DOCUMENTS

| | | | |
|---|---|---|---|
| 253,581 | 2/1882 | Butler | 269/3 |
| 335,845 | 2/1886 | Singer . | |
| 887,661 | 5/1908 | Kuss | 269/3 |
| 1,119,374 | 12/1914 | Stirk . | |
| 1,334,971 | 3/1920 | Shore | 269/3 |
| 1,411,488 | 4/1922 | Gilmour . | |
| 1,524,753 | 2/1925 | Schwerin | 29/229 |
| 3,108,783 | 10/1963 | Foust et al. | 29/225 |
| 3,228,101 | 1/1966 | Madeira . | |
| 3,365,782 | 1/1968 | Madeira . | |
| 3,681,840 | 8/1972 | Pool | 29/229 |
| 3,813,750 | 6/1974 | Kerr . | |
| 4,004,338 | 1/1977 | Breitbach . | |
| 4,689,865 | 9/1987 | Chamblee . | |
| 4,862,572 | 9/1989 | Jeromson, Jr. et al. . | |
| 5,062,191 | 11/1991 | Carr . | |
| 5,732,992 | 3/1998 | Mauldin | 269/242 |

*Primary Examiner*—David A. Scherbel
*Assistant Examiner*—Lee Wilson
*Attorney, Agent, or Firm*—Luedeka, Neely & Graham, P.C.

[57] ABSTRACT

A hand tool for installing retainer rings includes a frame element, a pair of swing arms and a threaded drive shaft. The frame is an axially elongated post element having a pair of pivot joints symmetrically disposed on opposite sides of a post axis along a line substantially normal to the post axis. A pair of swing arms attached to the pivot joints for partial rotation about respective pivot joint axes, extend together along the post axes away from a handle portion of the post length. Retainer ring engagement nibs are secured to extension arms that project from distal ends of the swing arms. Threaded follower blocks pivotally secured to each of the swing arms receive respectively threaded opposite ends of the drive shaft. A midposition of the drive shaft is secured to the post element with rotational freedom and axial restraint. Thread leads of the two follower blocks are oppositely turned to produce oppositely directed movement of the retainer ring nibs when the drive shaft is rotated.

7 Claims, 3 Drawing Sheets

RETAINER RING TOOL

BACKGROUND OF THE INVENTION

The present invention relates to hand tools. In particular, the invention relates to a tool for installing and removing machine assembly devices known as retainer rings or snap rings.

Retainer rings are C-shaped springs, usually of a high carbon steel, for example, having a relatively thin cross-sectional thickness. In the thickness dimension, the ring is substantially constant. In the frontal plan, the C-shape is modified first, by the presence of small, tool pin apertures through lobes that terminate the horn ends of the C. Frequently, the web of the C-shape is wider through the bight of the C-shape. A wide bight thickness enhances the C-shape capacity to oppose forces on the C-shape having the effect of opening or closing the ring by spreading the C-shape horns.

Retainer rings are internal and external gender specific as to relative geometry. An external ring is positioned around the outer perimeter of an element having circular section such as a rod or shaft. The exact axial position for the ring is determined by a relatively shallow slot or groove that is cut, turned or otherwise formed around the shaft perimeter at the required position along the shaft axis. The slot width is only slightly greater than the ring width. The diameter of the shaft slot is therefor less at the bottom of the slot than the outside surface diameter of the shaft.

An external retainer ring is constructed with a partial circle internal perimeter having an inside diameter greater than the diameter of the shaft slot bottom but less than the outside diameter of the shaft. Consequently, the retainer ring horns must be spread to open the ring internal perimeter sufficiently to allow the ring to be passed axially over the shaft end, along the shaft length and into transverse planar alignment with the retainer slot. So aligned, the horn spreading stress is removed thereby permitting the retainer ring horns to return to their unstressed form within the retainer slot. The internal perimeter of the C-shape is below the shaft external surface whereas the external perimeter of the C-shape is above the shaft external surface. Consequently, the radial, fin-like projection of the retainer ring from the shaft surface presents a structural abutment to the relative axial displacement of bore elements around the shaft in at least one axial direction.

An internal retainer ring has a complimentary construction for positionment around the internal perimeter of a circular bore. A narrow shallow retainer slot is formed into the bore wall at the desired axial location. The partial circle of the retainer ring has a circular outer perimeter with a diameter slightly less than the internal diameter of the slot bottom but greater than the internal diameter of the bore wall. Consequently, the retainer ring horns are stressed inwardly to close the ring opening and reduce the ring outer perimeter for the purpose to inserting the ring axially along the bore to transverse planar alignment with the retainer slot. Here, the stress is released and the retainer ring is allowed to spring open into the retainer slot. However, the ring internal perimeter elements project radially from the retainer slot into the bore as abutments to prevent axial displacement of such machine elements as bearing races and shaft seals.

Both external and internal retainer rings are gripped for horn displacement by tool nibs that are inserted into a small circular aperture in each of a lobe element that is integrally formed at the end of each ring horn. Depending on whether the retainer ring is of the internal or external gender, the lobe area is turned inwardly or outwardly and does not invade the slot penetrating circle of the ring. Accordingly, the lobes are turned inside of the outside diameter of an internal retainer ring whereas the lobes of an external retainer ring are turned outside of the inside diameter of an external retainer ring. This geometry facilitates placement of the tool nib apertures at an accessible location relative to the respective shaft or bore surface elements.

The traditional retainer ring tool is a plier type implement having a pin projecting from each nib. This type of tool is suitable for manipulating small, easily accessible retainer rings. However, corrosion, physical damage and complex assembly challenges the utility of such tools. Since the gripping contact between the tool and the ring is only the engagement area between the tool nibs and the apertures in the ring lobes, there is little tolerance or accommodation for twisting and other assembly manipulations, usually employed under difficult circumstances. Moreover, large retainer rings require some sort of mechanical advantage for installation and removal.

As a further note on the prior art, plier type tools, with or without mechanical advantage, displace the retainer ring lobes along a chord line of the retainer slot having little radial component. If the slot is corroded, contaminated with fine grit or physically damaged as by peening along the retainer slot, a chord line displacement of the ring lobes is longer and more difficult than a radial displacement.

It is therefore, an object of the present invention to provide an improved retainer ring tool having positive pin movement for controlled ring location and placement.

Another object of the present invention is an improved retainer ring tool having utility in limited access areas.

A further object of the invention is an improved retainer ring tool that is designed for extended reach utility.

Also an object of the present invention is an improved retainer ring tool with replaceable ring lobe engagement nibs and replaceable arms for mounting the nibs.

Yet another object of the invention is an improved retainer ring tool designed to provide a more radial nib movement into and from a retainer slot for improved ring manipulation control.

Another object of the invention is a retainer ring tool having a right angle nib mounting arm designed for extended reach visibility.

Another object of the invention is an improved, ergonomically designed holding handle for a retainer ring tool.

Finally, an object of the invention is an ergonomically designed nib adjusting wheel for positive control of large, heavy duty retainer rings.

SUMMARY OF THE INVENTION

These and other objects of the invention as will subsequently become apparent from the following description of the preferred invention embodiments are accomplished by a 4-point crossbar tool frame having a post and crossbar. An intersection between the crossbar length and the post length is substantially normal and respectively mid-length of each. The crossbar thereby provides a pair of structurally static arms extending symmetrically in opposite directions from an axis along the post length. Below the crossbar intersection, the post provides a handlebar. Above, the post provides a bearing pillar.

Along the length of the crossbar arms are one or more pairs of journal pin apertures positioned substantially symmetrically on opposite sides of the post axis. A pair of swing arms are pivotally mounted to a respective pair of journal pin apertures.

Swing arm length extends from a pivot connection with the crossbar arms alongside the post bearing pillar and past the distal end of the bearing pillar. The pivot connection between the swing arms is axial to substantially restrict rotation of the swing arms to a substantially common plane of swing arc. To the projected ends of the swing arms, nib carrier arms are removably secured. Such nib carrier arms project in a convenient direction from the swing arm length, preferably, about 90° to the common swing arc plane of the swing arms. At the distal ends of the carriers arms opposite from the swing arms, sockets are provided for the attachment of replaceable retainer ring nibs.

Between the end of the crossbar pivot connection and the nib carrier arm end of each swing arm is a pivotally mounted follower block. The pivot axis of each follower block is substantially normal to the swing arc plane. Both follower blocks are penetrated by a screw threaded bore along an axis substantially parallel with the swing arc plane. However, the twist angles respective to each threaded block bore are opposite from the other.

A drive shaft is pivotally attached to the bearing pillar for rotation about the shaft axis. The shaft rotational axis is substantially parallel with the swing arc plane of the swing arms. However, the drive shaft is restrained from movement relative to the bearing pillar in either direction along the drive shaft axis. In a preferred embodiment, the drive shaft connection with the bearing pillar permits limited translation of the drive shaft normal to the drive shaft axis along a plane substantially parallel with the swing arc plane.

From the bearing pillar connection, the drive shaft is threaded in opposite directions and with oppositely turned thread angles corresponding to the respective follower block bores. Each threaded end of the drive shaft is turned through the respective follower block bore with one end of the drive shaft extended to receive a hand wheel or other type of rotational cranking lever.

The threaded drive shaft and crank wheel provide great mechanical advantage for stressing large retainer rings coupled with stable positionment of the stressed setting that is free of manual exertion. Rotation of the drive shaft moves the nib carrier arms in opposite directions dependent upon the direction of rotation. However, due to the axial confinement of the drive shaft relative to the bearing pillar, swing arm rotation relative to the bearing pillar is substantially symmetric. Alignment of the follower blocks in opposite directions along the drive shaft axis relative to positionment of the swing arm pivot axes on the crossbar arms determines the arc of relative nib displacement to provide the desired radial component; whether in or out.

DESCRIPTION OF DRAWINGS

The preferred embodiments of the invention are hereafter described in greater detail with respect to the drawings wherein like or similar elements throughout the several figures of the drawings are identified by the same reference character and wherein.

DESCRIPTION OF THE PREFERRED EMBODIMENTS

Figures 1, 2, 3, 4, 5:
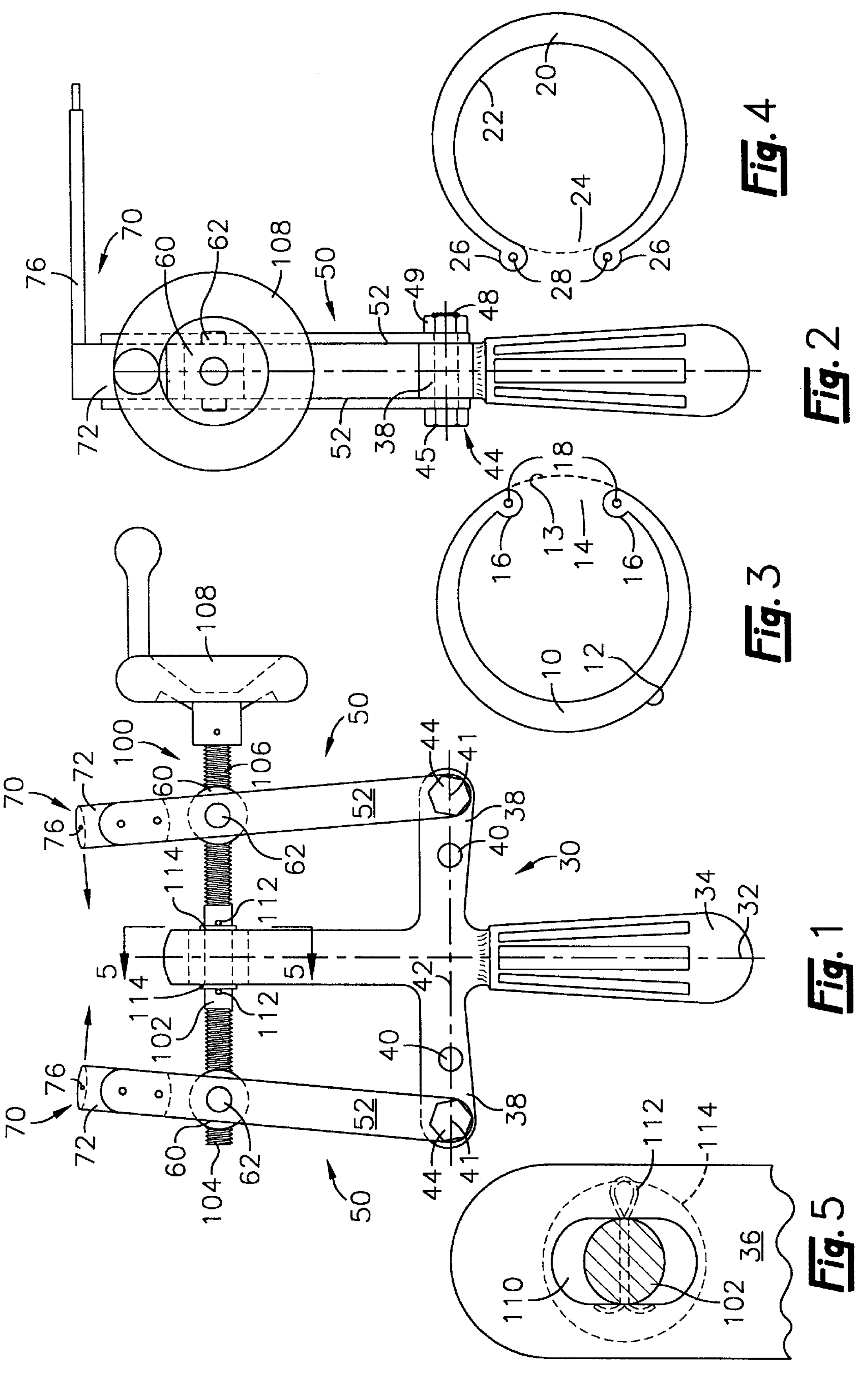
FIG. 1 is a front elevational view of the invention.
FIG. 2 is an end elevational view of the invention.
FIG. 3 is an internal retainer ring.
FIG. 4 is an external retainer ring.
FIG. 5 is a first embodiment detail of the bearing pillar assembly with the drive shaft.

With respect to the drawings, FIGS. 3 and 4 illustrate two gender examples of typical retainer rings of the type the present invention is intended to operate. FIG. 3 illustrates an internal retainer ring 10 having a circular outer perimeter 12 that meshes within a retainer groove in an internal bore opening. Note the dashed line 13 that arcuately spans the retainer ring opening 14 between the horn lobes 16. The lobes 16 do not invade the circular continuity of the outside circular perimeter 12. These horn lobes 16 are turned inwardly from the circle 12 to position the tool nib engagement holes 18 inside of the bore wall for accessibility.

External retainer ring 20 illustrated by FIG. 4 differs from the above description by an internal slot perimeter 22 having a circular continuity that bridges the ring opening 24 between the horn lobes 26. The horn lobes 26 are turned outwardly from the circle 22 to position the tool engagement holes 28 for accessibility outside of a circumferential retainer groove around the outer surface perimeter of a circular cross-section shaft, for example.

As may be observed from the internal retainer ring 10 of FIG. 3, installation and removal of the ring in an internal boring requires the horn lobes 16 to be drawn together thereby reducing the perimeter of the outside diameter groove circle 12. Hence, the groove circle 12 is reduced to a dimension less than the inside diameter of the applied bore thereby permitting extraction of the ring 10 from the corresponding retainer groove. Conversely, installation and removal of the external ring 20 of FIG. 4 requires the horn lobes 26 to be separated thereby increasing the perimeter of the inside diameter groove circle 22. A perimeter increase of the groove circle 22 to a dimension greater than the outside diameter of the applied shaft permits the ring to be extracted from the correspond retainer groove around the external surface of an applied shaft.

In both gender examples of retainer rings, the essential groove circle distortion of the ring shape is accomplished by tool nib engagement of the horn lobe apertures 16 or 26, respectively. For small retainer rings, less than 2 in., for example, applied to open, easily accessible assemblies, a plier type tool operated with a manual hand-grip is usually satisfactory. However, when a retainer ring is significantly larger and/or the assembly is difficult to access it becomes necessary to hold the retainer ring in the distorted shape for an extended period of time while other machine elements are manipulated in such manner as to permit alignment of the retainer ring with the corresponding retainer groove.

Figure 8:
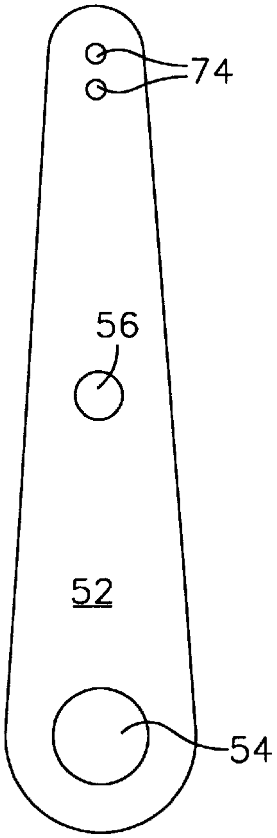
FIG. 8 is a front elevation of a swing arm element.
Figure 9:
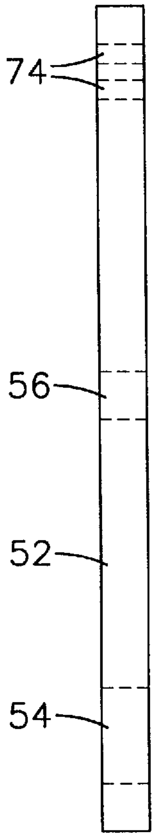
FIG. 9 is an end elevation of a swing arm element.
Figure 12:
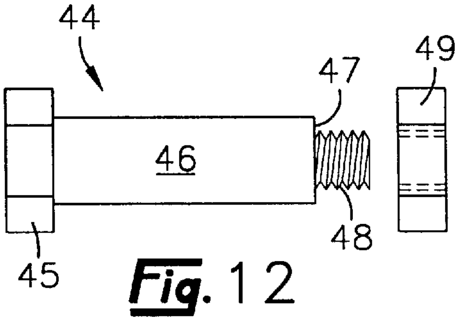
FIG. 12 is a side elevation of a shoulder bolt.
Figure 15:
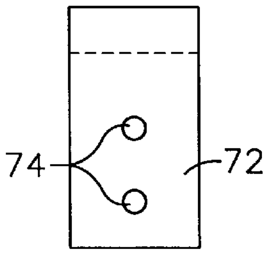
FIG. 15 is a back end view of the nib carrier arm.

To address these larger and more complex assemblies, the present invention of FIGS. 1 and 2 comprises a frame member 30 in the general form of a post and cross-bar. Along a post axis 32, a handle 34 is substantially aligned with a bearing pillar 36. The cross-bar forms a pair of arms 38 projecting laterally to opposite sides of the post axis 32. For the FIGS. 1 and 2 embodiment of the invention, the arms 38 extend from the frame post at an intermediate point between the handle 34 and the bearing pillar 36. One or more pairs of pivot pin bores 40 penetrate the arms 38 along a line 42 that is substantially normal to the post axis 32. Respective to each pair of pivot pin bores 40, the bores are substantially symmetrically displaced from the post axis 32. These pivot pin bores are sized to receive the smooth surface shaft 46 of a shoulder bolt 44 (FIG. 12). The bolt head 45 delineates one end of the shaft 46 whereas an annular shoulder 47 delineates the opposite end of the shaft 46. A threaded stud 48 of smaller outside diameter than the shaft 46 projects coaxially from the shaft shoulder to receive a cooperative locknut 49. When the lock nut 49 is turned tightly against the bolt shoulder 47, the shaft surface 46 constitutes a journal pin with barrier at opposite axial ends of the pin to confine a journal bearing element therebetween. In the present invention, the shoulder bolt 44 radially confines a pair of arm straps 52 respective to each of a pair of swing arms 50 relative to the axis of a pivot pin bore 40. Referring to FIGS. 8 and 9, the arm straps 52 have a journal bearing bore 54 for coaxial receipt of a shoulder bolt 44. As shown by FIG. 2, the shoulder bolt 44 unitizes two arm straps 52 with a cross-bar arm 38. The length of the shoulder bolt shaft 46 is slightly greater than the sum of the thickness of the two arm straps 52 and the pivot pin bore length whereby the arm straps 52 retain rotational freedom about the shoulder bolt shaft when the lock nut 49 is turned tightly against the bolt shoulder 47.

Figure 10:
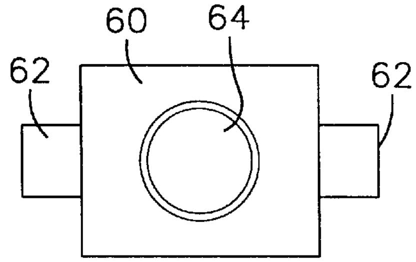
FIG. 10 is a front elevation of a follower block.
Figure 11:
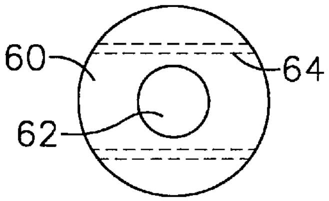
FIG. 11 is an end elevation of a follower block.

As described above with respect to FIGS. 1 and 2, each swing arm 50 comprises a pair of parallel arm straps 52. At a selected midpoint between opposite ends of the arms strap 52 is a second journal bearing bore 56. This second bearing bore is sized to receive the journal pins 62 of a follower block 60 shown in detail by FIGS. 10 and 11. The journal pins 62 pivotally socket in the arm strap bearing bores 56. A threaded bore 64 is formed through the follower block 60 substantially transverse of an axis common to the journal pins 62. Distinctively, the internal threads of one bore 64 have an oppositely turned lead advance relative to the other bore 64. In other terms, "right-hand" threads are turned in one bore 64 and "left-hand" treads turned in the other.

At the outer ends of the swing arms 50 distal from the journals 54, the two arm straps 52 are unitized against a mounting block portion 72 of a nib carrier arm 70 as best illustrated by FIGS. 13–16. Threaded fasteners not shown pass through the apertures 74 to clamp the carrier arm mounting block 72 between the arm strap ends. A reach bar 76 that is rigidly integral with the mounting block 72 projects from the block 72 in a direction that is substantially normal to the arcuate plane of swing arms 50.

Figure 13:
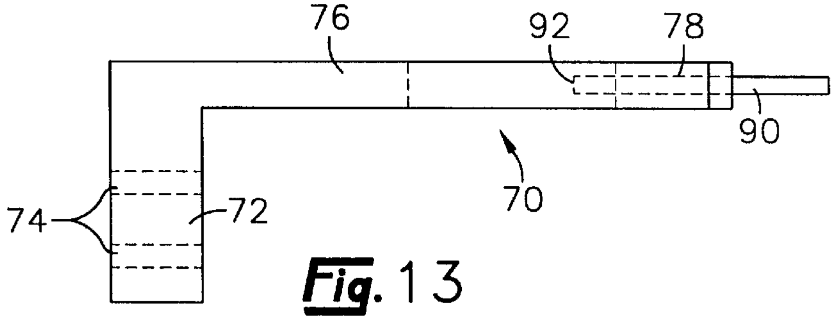
FIG. 13 is a side elevation of a nib carrier arm.
Figure 16:
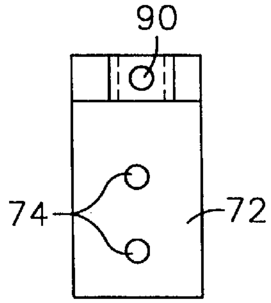
FIG. 16 is a front end view of the nib carrier arm.
Figure 14:
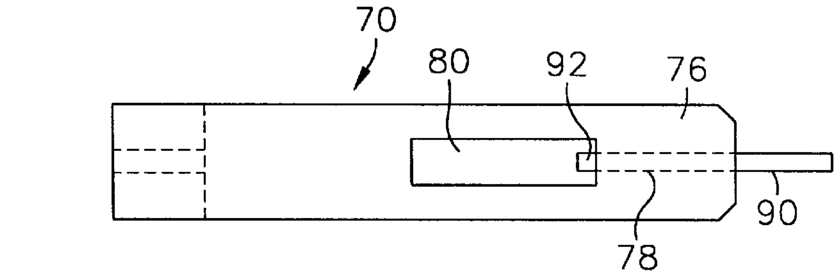
FIG. 14 is a top view of the nib carrier arm.

Opposite from the mounting block 72, the reach bar 76 has a replaceable nib mount shown by FIGS. 13, 14 and 16. The nib mount comprises a nib socket bore 78 that parallels the reach bar length between the distal end of the reach bar and a slot 80. The nib socket 78 is sized to receive a nib rod 90, preferably with a snug push-fit. The slot 80 is illustrated as a rectangular aperture through the reach bar thickness. Operatively, a nib rod 90 is pushed or pressed into the nib socket 78 at a depth sufficient to secure the inner end 92 of the nib rod and leave a desired working length of the rod 90 projecting from the distal end of the reach bar 70. Not infrequently, the nib rods 90 are broken or damaged in use thereby requiring replacement. Normally, replacement simply requires extraction of the damaged nib rod from the socket 78 with a pair of standard gripping pliers. However, occasionally the nib rod breaks at a point too close to the end of the reach bar to be gripped by plier nibs. In these cases, the end of a tool such as a punch is positioned against the fractured end of the nib rod 90 remaining in the socket 78 to push or drive the rod 90 remainder axially along the socket 78 into the slot 80 clear of the socket 78 bore. Once clear of the socket bore, the fractured remainder of the nib rod 90 is removed laterally from either side of the slot 80.

Figure 6:
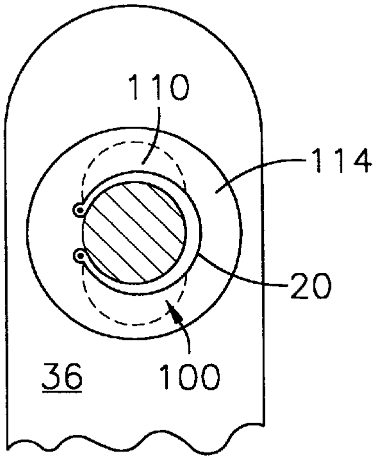
FIG. 6 is a second embodiment detail of the bearing pillar assembly with the drive shaft.
Figure 7:
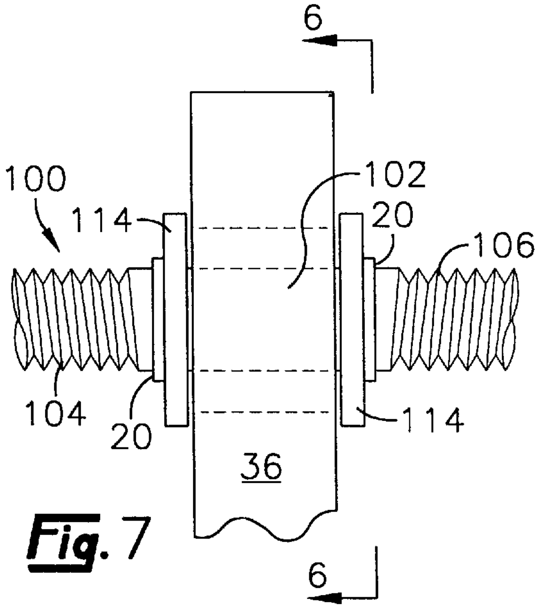
FIG. 7 is a side elevation of the FIG. 6 detail.

The drive shaft 100, shown in assembly by FIG. 1 and in detail by FIGS. 5, 6 and 7, comprises a circular section shaft that is threaded in opposite directions from an interior journal section 102. The thread leads of these opposite ends of the shaft 100 are turned with opposite advancement angles. For example, the end 104 opposite from the crank wheel 108 may be given a right-hand thread and the shaft end 106 next to the crank wheel 108 given a left-hand thread. It is a matter of design preference as to the specific thread advancement orientation given to a respective shaft end except that the thread of a cooperative follower block bore 64 must be compatible with the chosen assignment.

The journal section 102 of the drive shaft is secured for rotation within a bearing slot 110 through the frame bearing pillar 36. This connection to the bearing pillar also permits limited "lost motion" translation of the drive shaft axis along the bearing pillar length to accommodate dimensional changes between the drive shaft axis and the cross-bar axis 42 as the swing arms 50 rotate about respective pivot pin axes 41. However, connection of the drive shaft 100 to the bearing pillar prohibits axial displacement of the shaft in either direction through the bearing slot 110. These three important functions are accomplished simultaneously by a first embodiment shown by FIGS. 1 and 5. Here, the bearing slot 110 is given a transverse width that closely accommodates the drive shaft journal section 102 diameter for lateral position control. Longitudinally of the bearing pillar length, however, the bearing slot 110 is elongated sufficiently to accommodate the "lost motion" of the swing arms 50. On opposite sides of the bearing pillar 36, the drive shaft journal section 102 is transversely bored to receive retainer pins 112. These retainer pin bores are preferably positioned axially along the drive shaft length to accommodate a thrust washer 114 between each pin 112 and the adjacent bearing pillar face.

A second embodiment of the drive shaft 100 connection to the bearing pillar 36 is shown by FIGS. 6 and 7. Here, the thrust washers 114 are axially confined by external retainer rings 20. Since the bearing pillar 36 is caged between the thrust washers 114 from both axial directions of the drive shaft 100, the drive shaft has no latitude of axial freedom or movement. Simultaneously, however, the drive shaft can rotate in either direction within the bearing slot 110 and translate along the slot length.

With respect to the total assembly of the invention as shown by FIGS. 1 and 2, the swing arms 50 are attached to the frame cross-bar arms 38 at a pivot pin bore that is more distant from the frame post axis 32 than the axes of follower block journal pins 62. Hence, when the drive shaft 100 is rotated to swing the arms 50 in opposite directions toward each other for the purpose of placing an internal retaining ring 10, this arcuate movement includes an inwardly directed radial component along the post axis 32 toward the cross-bar axis 42.

For an external retaining ring 20, rotation of the drive shaft 100 to spread the retainer ring horn lobes 26 includes an outwardly directed radial component along the post axis 32 away from the cross-bar 38. Additional pivot pin bore sets 40 along the cross bar arms 38 allow this radial component movement to be applied to a wider size range of retainer rings.

In a specific application of the invention and the relatively deep reach of the nib carrier arms, relatively large retainer rings of either gender may be positioned deeply within a narrow annulus between the inside diameter of a machine housing bore and the outside diameter of a shaft protruding through the housing bore.

Figure 17:
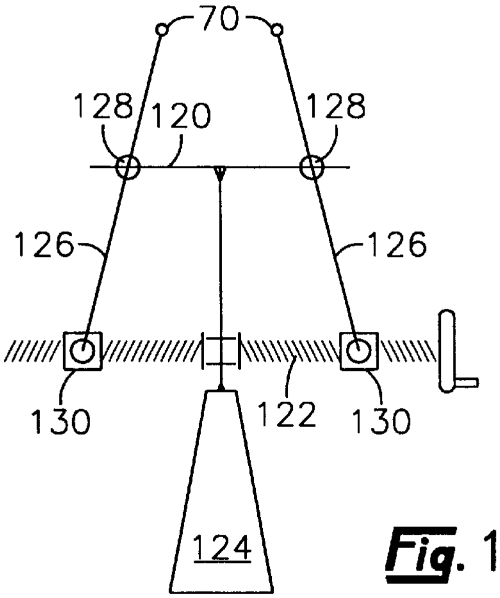
FIG. 17 is a mechanical schematic of an alternative embodiment of the invention.

An alternative organizational embodiment of the invention is shown by FIG. 17 which reverses the order of the frame cross-bar 120 and drive shaft 122 relative to the frame handle 124. In this embodiment, the distance between the mid-pivots 128 of the swing arms 126 is fixed with respect to the cross-bar 120. The distance between the distal end pivots 130 is variable by rotation of the drive shaft 122. Properly dimensioned, however, displacement of the nib carrier arms 70 remains the same as with the FIGS. 1 and 2 embodiment.

The foregoing description of the preferred embodiments of the invention has been presented for purposes of illustration and description. It is not intended to be exhaustive or to limit the invention to the precise forms disclosed. Obvious modifications or variations are possible in light of the foregoing teachings. These embodiments were chosen and described to provide the best illustrations of the invention principles and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

As our invention, therefore,

We claim:

1. A retainer ring installation tool comprising a frame member, a pair of swing arms and a drive shaft: said frame member including an elongated post element having a pair of pivot joints substantially symmetrically disposed on opposite sides of a post element axis along a line substantially normal to said post element axis, one end of said post element having a handlebar for manual grasp of said tool; respective members of said pair of swing arms being pivotally secured to each of said pivot joints; said swing arms being extended from said pivot joints in a direction substantially opposite from said handle bar for partial rotation about respective pivot joint axes, distal ends respective to swing arms having retainer ring engagement nibs secured thereto, each swing arm of said pair having a follower block pivotally attached thereto, each follower block having a threaded shaft receiver, thread twist respective to each shaft receiver being of opposite hand lead; said drive shaft being axially elongated and secured to said post element at an intermediate location along the drive shaft length to permit rotation of said drive shaft but substantially prevent displacement of said drive shaft along the drive shaft axis relative to said post element, said drive shaft being threaded in opposite directions from the post secured location thereof and turned into respective follower blocks whereby rotation of said drive shaft rotates said swing arms in opposite arcuate directions about said pivot joints to substantially the same arcuate degree.

2. A retainer ring installation tool as described by claim 1 further comprising elongated nib carrier arms secured to said distal ends of said swing arms, said nib carrier arms being extended from said distal ends in a direction substantially parallel with said pivot joint axes.

3. A retainer ring installation tool as described by claim 2 wherein retainer ring engagement nibs are replaceably secured to said carrier arms.

4. A retainer ring installation tool as described by claim 1 wherein said drive shaft is secured to said post to permit limited translation of said drive shaft in directions substantially parallel with said post axis.

5. A retainer ring installation tool as described by claim 1 wherein said follower blocks are attached to said swing arms to permit limited translation of said follower blocks along the length of said swing arms.

6. A retainer ring installation tool as described by claim 1 wherein said follower blocks are pivotally attached to respective swing arms intermediate of said distal ends and said pivot joints.

7. A retainer ring installation tool as described by claim 1 wherein said swing arms are pivotally secured to said pivot joints intermediate of said follower blocks and said distal ends.

* * * * *